United States Patent
Yu et al.

(10) Patent No.: US 10,614,290 B1
(45) Date of Patent: Apr. 7, 2020

(54) OBJECT POSITION DETERMINATION CIRCUIT

(71) Applicant: Realtek Semiconductor Corp., HsinChu (TW)

(72) Inventors: Teng-Hsiang Yu, New Taipei (TW); Yen-Hsing Wu, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/574,030

(22) Filed: Sep. 17, 2019

(30) Foreign Application Priority Data

Dec. 11, 2018 (TW) .............................. 107144611 A

(51) Int. Cl.
| | |
|---|---|
| *G06K 9/00* | (2006.01) |
| *G06T 7/77* | (2017.01) |
| *G06T 7/215* | (2017.01) |
| *G06T 7/70* | (2017.01) |
| *G06T 7/90* | (2017.01) |

(52) U.S. Cl.
CPC .......... *G06K 9/00228* (2013.01); *G06T 7/215* (2017.01); *G06T 7/70* (2017.01); *G06T 7/77* (2017.01); *G06T 7/90* (2017.01); *G06K 2209/21* (2013.01); *G06T 2207/20084* (2013.01); *G06T 2207/30201* (2013.01)

(58) Field of Classification Search
CPC .. G06K 9/00228; G06K 2209/21; G06T 7/77; G06T 7/90; G06T 7/70; G06T 7/215; G06T 2207/30201; G06T 2207/20084
See application file for complete search history.

(56) References Cited

U.S. PATENT DOCUMENTS

| | | | | |
|---|---|---|---|---|
| 8,509,487 | B2* | 8/2013 | Lim | ........................ G01P 3/806 382/106 |
| 2009/0279742 | A1* | 11/2009 | Abiko | ................. G06K 9/00026 382/107 |
| 2015/0154472 | A1* | 6/2015 | Yano | ...................... G06F 16/583 382/219 |
| 2016/0148054 | A1* | 5/2016 | Han | ................... G06K 9/00355 382/103 |
| 2018/0084310 | A1* | 3/2018 | Katz | ...................... G06F 16/783 |

* cited by examiner

*Primary Examiner* — Dhaval V Patel
(74) *Attorney, Agent, or Firm* — Winston Hsu

(57) ABSTRACT

The present invention provides an object position determination circuit including a receiving circuit, a detecting circuit and a calculating circuit. In the operations of the object position determination circuit, the receiving circuit is configured to receive an Nth frame and an (N+M)th frame of an image signal, where N is a positive integer, and M is a positive integer greater than one; the detecting circuit is configured to detect positions of an object in the Nth frame and the (N+M)th frame; and the calculating circuit is configured to generate a position of the object in an (N+M+A)th frame according to the positions of the object in the Nth frame and the (N+M)th frame, wherein A is a positive integer.

15 Claims, 5 Drawing Sheets

OBJECT POSITION DETERMINATION CIRCUIT

BACKGROUND OF THE INVENTION

1. Field of the Invention

The present invention is related to image processing, and more particularly, to a circuit for determining a position of a specific object in an image.

2. Description of the Prior Art

In current face identification systems, deep learning or neural networks are utilized to analyze and process an image to identify a position of a human face in the image. An artificial intelligence module for deep learning requires a high computation amount. The artificial intelligence module may be overloaded under a condition of a greater size of image data, so that an artificial intelligence module having greater ability is needed. This increases design and manufacturing costs.

SUMMARY OF THE INVENTION

Thus, an objective of the present invention is to provide an object position determination circuit, which can identify positions of an object in partial image frames only, and further calculate/estimate positions of the object in other image frames according to the positions of the object in these partial image frames in order to reduce loading of an artificial intelligence module.

In an embodiment of the present invention, an object position determination circuit is disclosed. The object position determination circuit comprises a receiving circuit, a detecting circuit and a calculating circuit. In operations of the object position determination circuit, the receiving circuit is configured to receive an $N^{th}$ frame and an $(N+M)^{th}$ frame of an image signal, wherein N is a positive integer, and M is a positive integer greater than one; the detecting circuit is configured to detect positions of an object in the $N^{th}$ frame and the $(N+M)^{th}$ frame; and the calculating circuit is configured to estimate a position of the object in an $(N+M+A)_{th}$ frame according to the positions of the object in the $N^{th}$ frame and the $(N+M)^{th}$ frame, wherein A is a positive integer.

In another embodiment of the present invention, a circuit comprising an object position determination circuit and an image processing circuit is disclosed. The object position determination circuit comprises a receiving circuit, a detecting circuit, a calculating circuit and an output circuit. In operations of the object position determination circuit, the receiving circuit is configured to receive an $N^{th}$ frame and an $(N+M)^{th}$ frame of an image signal, wherein N is a positive integer, and M is a positive integer greater than one; the detecting circuit is configured to detect positions of an object in the $N^{th}$ frame and the $(N+M)^{th}$ frame; the calculating circuit is configured to estimate a position of the object in an $(N+M+A)^{th}$ frame according to the positions of the object in the $N^{th}$ frame and the $(N+M)^{th}$ frame, wherein A is a positive integer; and the output circuit is configured to respectively output regions within the $N^{th}$ frame, the $(N+M)^{th}$ frame and the $(N+M+A)^{th}$ frame to serve as the positions of the object. In operations of the image processing circuit, the image processing circuit is configured to receive the image signal and perform image processing on the image signal according to the regions within the $N^{th}$ frame, the $(N+M)^{th}$ frame and the $(N+M+A)^{th}$ frame to generate a plurality of output images to a display panel for being displayed thereon.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
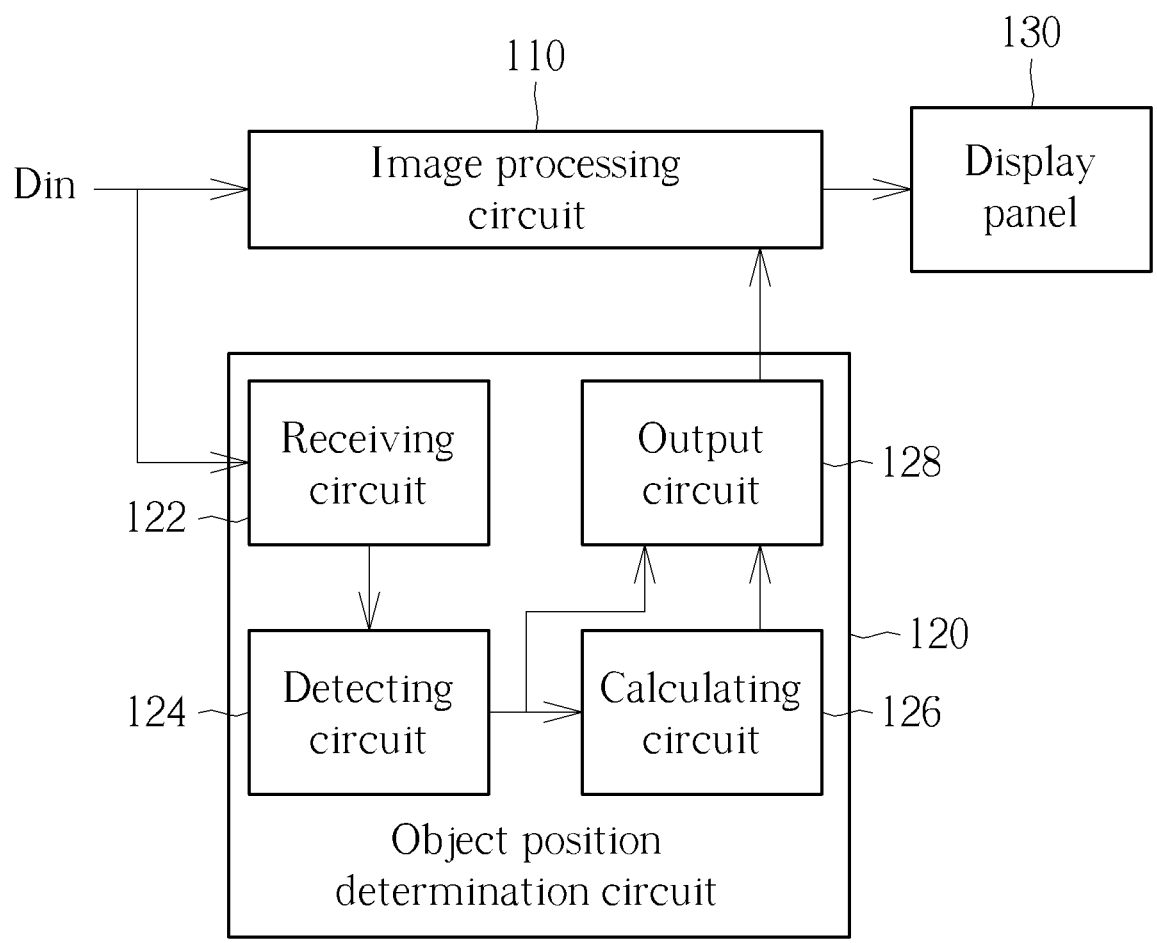
FIG. 1 is a diagram illustrating an electronic device according to an embodiment of the present invention.

FIG. 1 is a diagram illustrating an electronic device according to an embodiment of the present invention. As shown in FIG. 1, the electronic device comprises an image processing circuit 110, an object position determination circuit 120 and a display panel 130, where the objective position determination circuit 120 comprises a receiving circuit 122, a detecting circuit 124, a calculating circuit 126 and an output circuit 128. In this embodiment, the image processing circuit 110 and the object position determination circuit 120 may be integrated on a single chip, and the electronic device may be any type of electronic device comprising a display panel, such as a desktop computer, a laptop computer, or a mobile phone.

In operations of the electronic device, the image processing circuit 110 is configured to receive an image signal Din and generate a plurality of output images (frames) to the display panel 130 for being displayed thereon. Simultaneously, the object position determination circuit 120 determines positions of an object (e.g. a human face) in the plurality of frames of the image signal Din according to contents of the image signal Din, and generates object position information (e.g. coordinates of the object in the plurality of frames) to the image processing circuit 110 in order to process the image signal Din. Since determining a position of an object in an image is performed via deep learning or neural networks, which needs a high computation amount, processing ability of the object position determination circuit 120 is not enough to perform object position detection on each frame. The object position determination circuit 120 in this embodiment performs object position detection on partial frames only, and predicts positions of the object in other frames in a manner of extrapolation (e.g. linear extrapolation) in order to provide the image processing circuit 110 with enough object position information under a condition of meeting the processing ability of the object position determination circuit 120.

Figure 2:
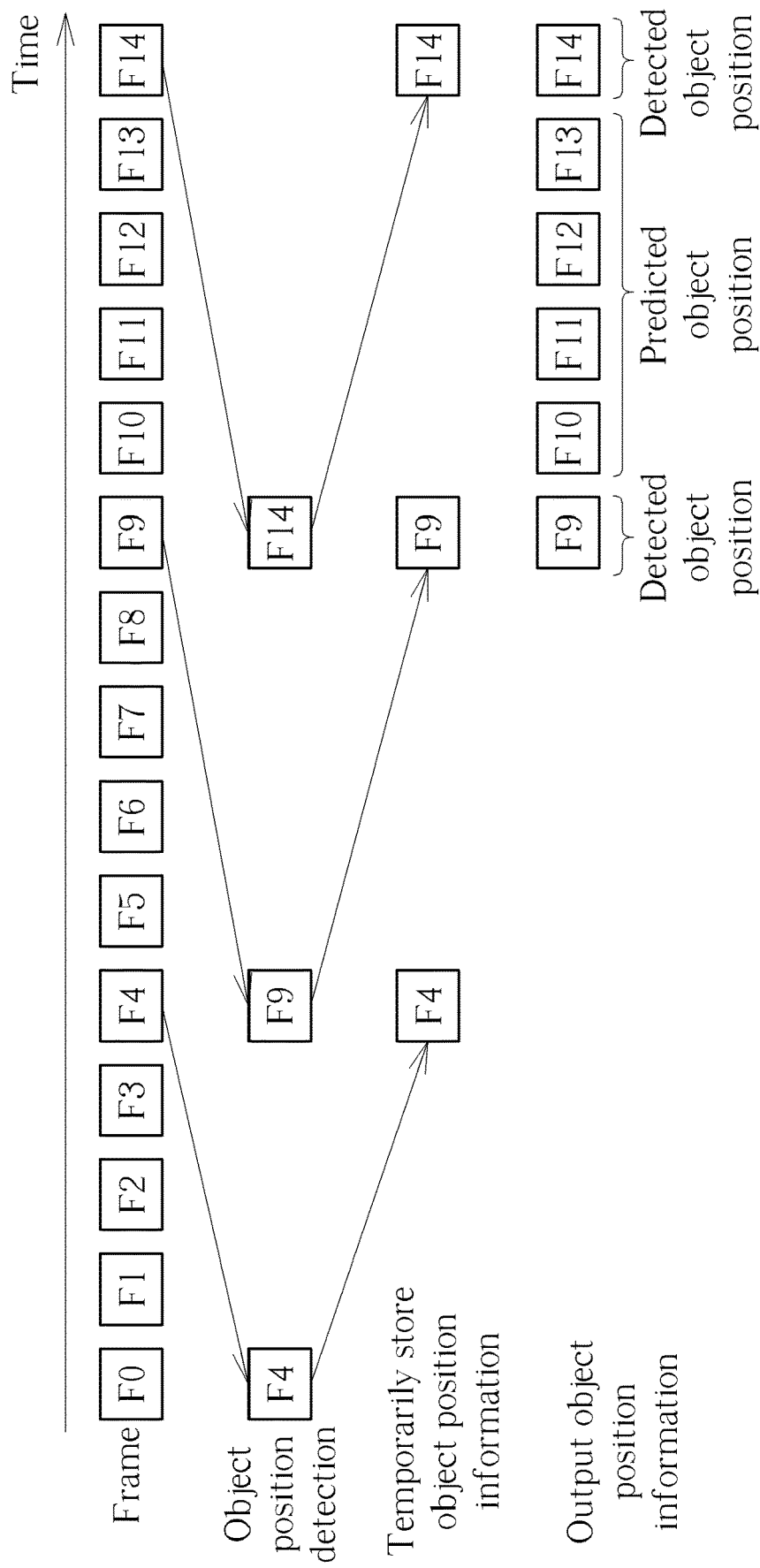
FIG. 2 is a timing diagram illustrating operations of an object position determination circuit according to an embodiment of the present invention.
Figure 3:
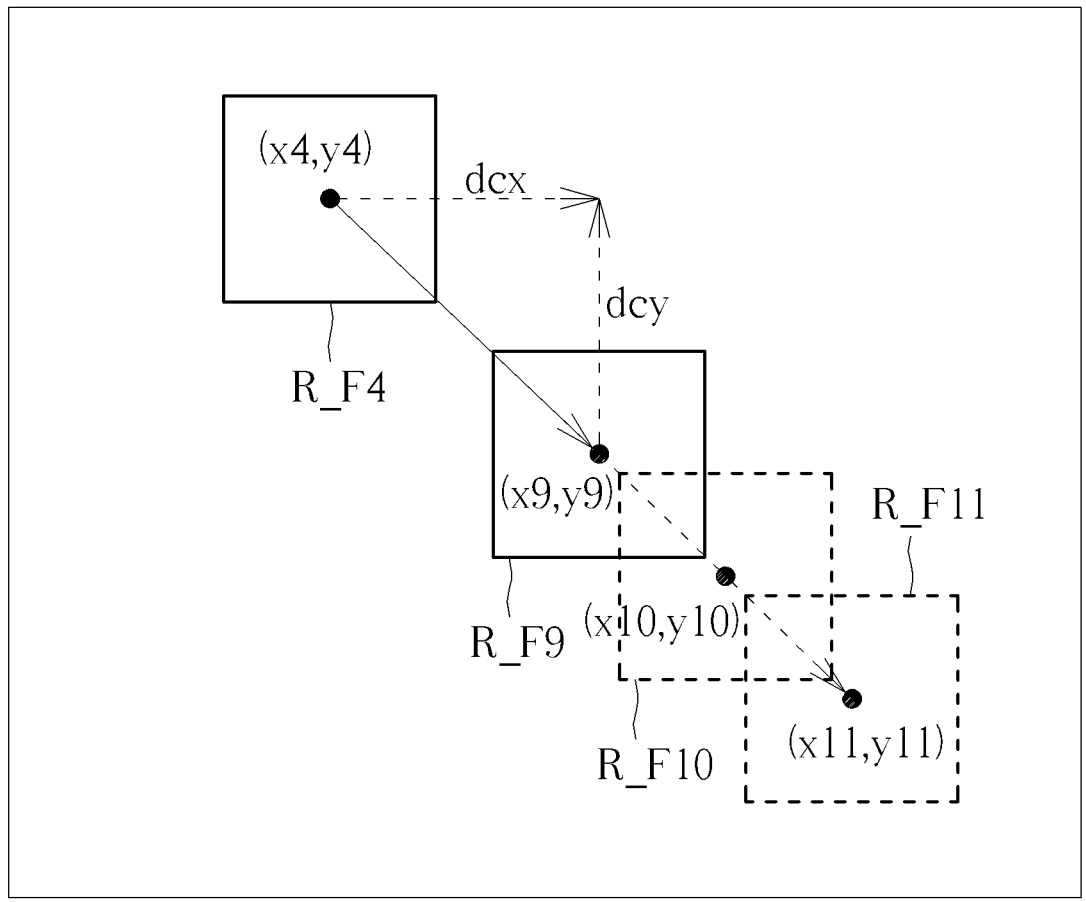
FIG. 3 is a diagram illustrating an object position determination circuit detecting or calculating object positions in different frames.

More specifically, refer to FIG. 1 and FIG. 2, where FIG. 2 is a timing diagram illustrating operations of the object position determination circuit 120 according to an embodiment of the present invention. As shown in FIG. 2, this embodiment assumes that the object position determination circuit 120 may perform object position detection once every five frames, i.e. the object position determination circuit 120 performs object position detection on frames F4 and F9 only, and further utilizes the detected positions of the object in the frame F4 and F9 to calculate/predict positions of the object in the frames F10, F11, F12 and F13 (referred to as F10-F13 for brevity), and then sequentially transmits the positions of the object in the frames F9, F10, F11, F12 and F13 (referred to as F9-F13 for brevity) to the image processing circuit 110 for further usage through the output circuit 128. Referring to FIG. 3, assuming that the object position determination circuit 120 determines the position of the object in the frame F4 as a region R F4 (having a center coordinate (x4, y4)) and determines the position of the object in the frame F9 as a region R_F9 (having a center coordinate (x9, y9)), the calculating circuit 126 may calculate a center coordinate (x10, y10) of a region R_F10 of the object in the frame F10 as follows: x10=x9+(dcx/5) and y10=y9+(dcy/5), where dcx=x9−x4 and dcy=y9−y4; a center coordinate (x11, y11) of a region R_F11 of the object in the frame F11 may be calculated as follows: x11=x9+2*(dcx/5) and y11=y9+2*(dcy/5); center coordinates of regions of the object in the frames F12 and F13 may be obtained through the aforementioned extrapolation calculation.

In an embodiment, the positions of the object in the frames F10-F13 are obtained from calculating prediction, rather than from the detecting circuit 124 using deep learning or neural networks, and may have some errors. Thus, the calculating circuit 126 may gradually increase sizes of the regions of the object in the frames F10-F13 during calculating; for example, a size of the region R_F10 of the object in the frame F10 set by the calculating circuit 126 is greater than a size of the region R_F9 of the object in the frame F9 detected by the detecting circuit 124, and a size of the region R_F11 of the object in the frame F11 set by the calculating circuit 126 is greater than the size of the region R_F10 of the object in the frame F10, where the rest may be induced by analogy. For example, assuming that a width and a height of the region R_F9 are respectively illustrated by w9 and h9, a width w10 and a height h10 of the region R_F10 may be respectively calculated as follows: w10=w9+(dcx/5)*p1 and h10=h9+(dcy/5)*p1, where p1 may be any suitable ratio parameter; a width w11 and a height h11 of the region R_F11 may be respectively calculated as follows: w11=w9+(dcx/5)*2*p1 and h11=h9+(dcy/5)*2*p1; widths and heights of the regions of the object in the frames F12 and F13 may be obtained through the aforementioned calculations.

In an embodiment, the detecting circuit 124 may generate corresponding reliability parameters during performing object detection on the frames F4 and F9, where the reliability parameters are configured to respectively indicate confidence levels of the positions of the object determined by the detecting circuit 124. Since the positions of the object in the frames F10-F13 are obtained from calculating prediction, the calculating circuit 126 may reduce reliability parameters corresponding to the frames F10-F13 during calculating the positions of the object in the frames F10-F13, i.e. the reliability parameter corresponding to the frame F10 is less than the reliability parameter corresponding to the frame F9, and the reliability parameter corresponding to the frame F11 is less than the reliability parameter corresponding to the frame F10, where the rest may be induced by analogy. The reduction rate of the reliability parameters can be set according to practical conditions, such as motion levels of contents in a video.

In another embodiment, the calculating circuit 126 may determine how to modify reliability information according to color/brightness information within the regions of the object in the frames F9-F13. For example, when a color/brightness difference between the region R_F10 of the frame F10 and the region R_F9 of the frame F9 is small, the calculating circuit 126 may slightly reduce the reliability parameter corresponding to the frame F10; and when the color/brightness difference between the region R_F10 of the frame F10 and the region R_F9 of the frame F9 is big, the calculating circuit 126 may greatly reduce the reliability parameter corresponding to the frame F10. For example, assuming that brightness of most pixels within the region R_F9 is Y9 and brightness of most pixels within the region R_F10 is Yt, the reliability parameter corresponding to the frame F10 may be modified as follows: PV'=PV*(1−abs(Yt−Y9)), where PV is an original reliability parameter of the frame F10 (e.g. the reliability parameter corresponding to the frame F10 mentioned in last paragraph), abs( ) is an absolute value operator, and PV' is the reliability parameter after modification.

It should be noted that the aforementioned reliability parameters corresponding to the frames F10-F13 do not have to be generated or modified by the calculating circuit 126. For example, the processing circuit 110 may receive the reliability parameter corresponding to the frame F9 in order to generate or modify the aforementioned reliability parameters corresponding to the frames F10-F13.

Returning to FIG. 2, the frames F0, F1, F2, F3, F4, F5, F6, F7, F8, F9-F13 and F14 are sequentially processed by the image processing circuit 110 and transmitted to the display panel 130 for display. The object position determination circuit 120 may perform object position detection on the frame F4 during processing of the frame F0 by the image processing circuit 110, and temporarily store position information of the object in the frame F4; the object position determination circuit 120 may perform object position detection on the frame F9 during processing of the frame F4 by the image processing circuit 110, and temporarily store position information of the object in the frame F9. Then, the calculating circuit 126 calculates and predicts position information of the object in the frame F10-F13 according to the position information of the object in the frames F4 and F9 that are temporarily stored in the object position determination circuit 120. Then, the object position determination circuit 120 sequentially transmits the position information of the object in the frame F10-F13 to the image processing circuit 110 for performing image processing according to the position information.

Similarly, the object position determination circuit 120 then detects a position of the object in the frame F14, and calculates and predicts positions of the object in the frames F15, F16, F17 and F18 according to the positions of the object in the frames F9 and F14. Then, the object position determination circuit 120 sequentially transmits position information of the object in the frames F14, F15, F16, F17 and F18 to the image processing circuit 110 for performing image processing according to the position information.

Figure 4:
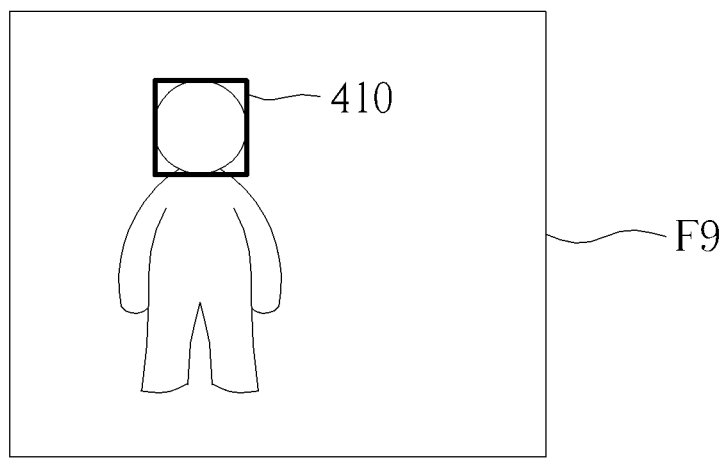
FIG. 4 is a diagram illustrating an image processing circuit performing image processing according to object position information.
Figure 4:
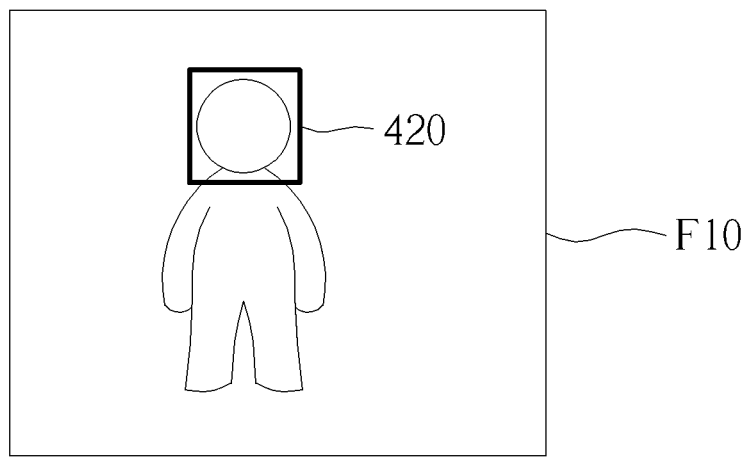
Figure 4:
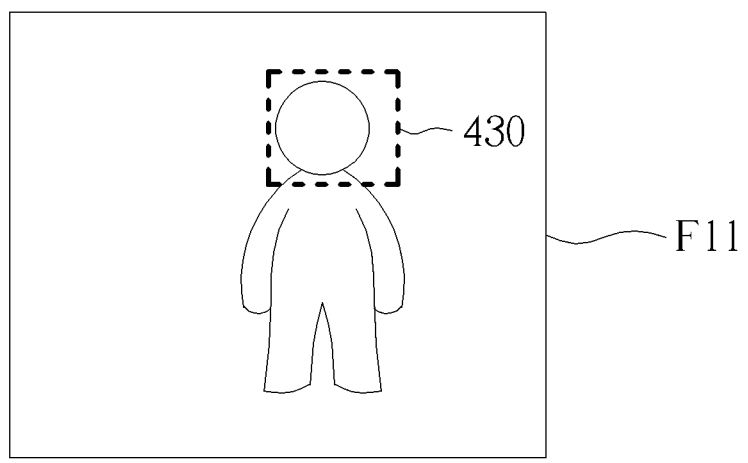

In an embodiment, the image processing circuit 110 may add a pattern on a frame to label the object according to object position information from the object position determination circuit 120. In an embodiment, if a reliability parameter corresponding to a frame is less than a threshold value, the image processing will not add the pattern on this frame. Taking FIG. 4 as an example for illustration, assuming that the object being detected is a human face, the object position determination circuit 120 transmits a coordinate of a region 410 to the image processing circuit 110 to serve as position information of the object, and the image processing circuit 120 adds a rectangle to label the position of the object in the frame F9. Then, the object position determination circuit 120 transmits a coordinate of the region 420 to the image processing circuit to serve as position information of the object, where the reliability parameter of the position of the object is assumed to be greater than the threshold value at this moment, and the image processing circuit 110 therefore adds a rectangle on the frame F10 to label the position of the object. Note that, since the position of the object in the frame F10 is calculated and predicted by the calculating circuit 126, a size of the region 420 is greater than a size of the region 410 (even though the object in the frame F9 and the object in the frame F10 have a same size). Then, the object position determination circuit 120 transmits a coordinate of the region 430 to the image processing circuit 110 to serve as position information of the object, where the reliability parameter of the position of the object is assumed to be less than the threshold value at this moment, and the image processing circuit would not add a rectangle on the frame F11. Note that, since the position of the object in the frame F11 is calculated and predicted by the calculating circuit 126 and after the frame F10, a size of the region 430 is greater than the sizes of the regions 420 and 410.

In another embodiment, the image processing circuit 110 may perform image processing on different regions in a frame indifferent manners according to object position information from the object position determination circuit 120. In an embodiment, if a reliability parameter of the corresponding frame is less than a threshold value, the image processing circuit 110 would not perform image processing on the different regions in the frame in different manners. More specifically, taking FIG. 4 as an example, regarding the frame F10, assuming that a reliability parameter of an object position is greater than the threshold value, the image processing circuit 120 would utilize a first image processing manner for the human face in the region 420, and utilize a second image processing manner for the portion outside of the region 420. In addition, regarding the frame F11, assuming that a reliability of an object position is less than the threshold value, the image processing circuit 120 would utilize the same image processing manner for both inside and outside of the region 430.

Figure 5:
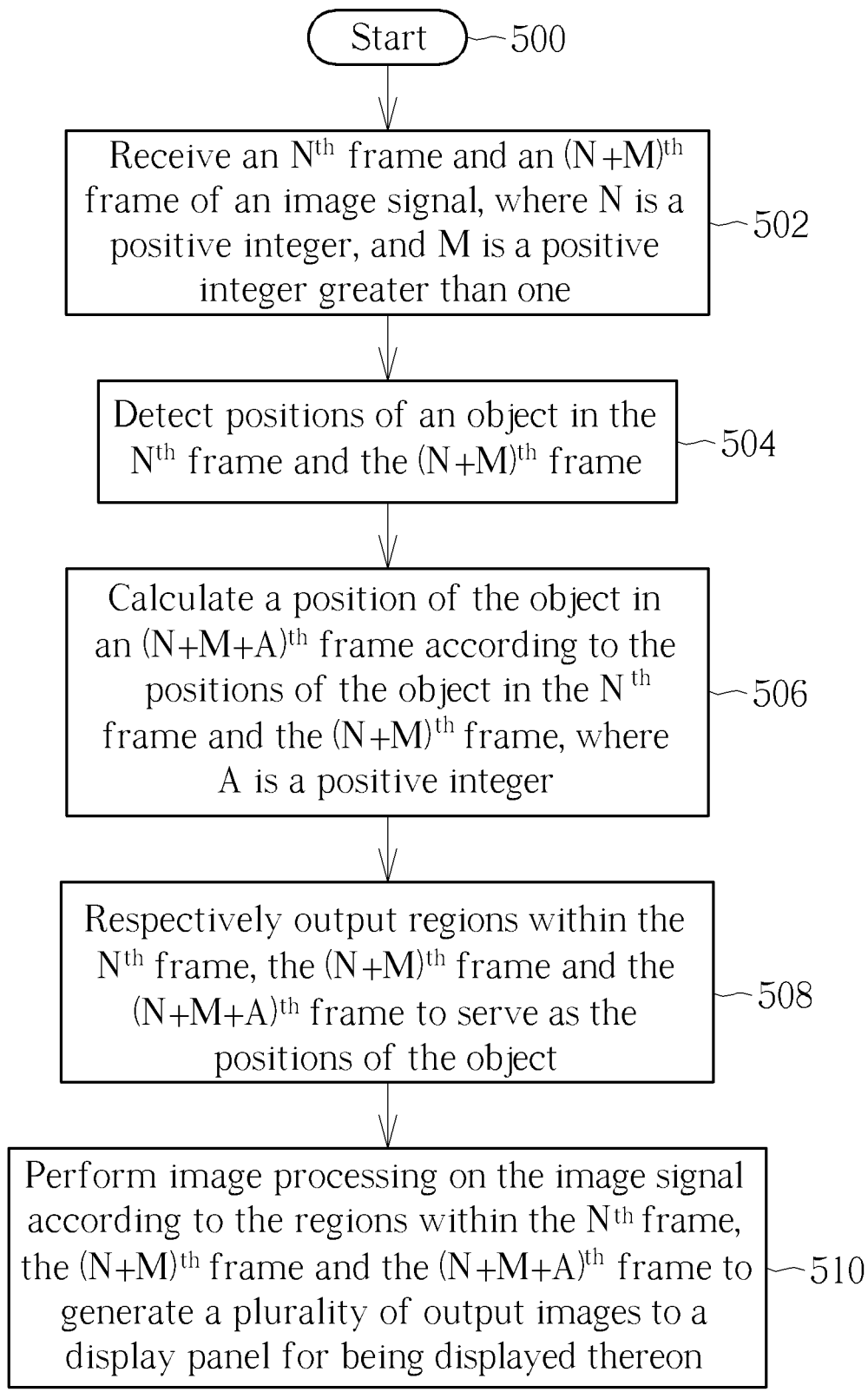
FIG. 5 is a flowchart illustrating an image processing method according to an embodiment of the present invention.

FIG. 5 is a flowchart illustrating an image processing method according to an embodiment of the present invention. Referring to the above description, the working flow of the image processing method is as follow.

Step 500: the flow starts.

Step 502: receive an $N^{th}$ frame and an $(N+M)^{th}$ frame of an image signal, where N is a positive integer, and M is a positive integer greater than one.

Step 504: detect positions of an object in the $N^{th}$ frame and the $(N+M)^{th}$ frame.

Step 506: calculate a position of the object in an $(N+M+A)^{th}$ frame according to the positions of the object in the $N^{th}$ frame and the $(N+M)^{th}$ frame, where A is a positive integer.

Step 508: respectively output regions within the $N^{th}$ frame, the $(N+M)^{th}$ frame and the $(N+M+A)^{th}$ frame to serve as the positions of the object.

Step 510: perform image processing on the image signal according to the regions within the $N^{th}$ frame, the $(N+M)^{th}$ frame and the $(N+M+A)^{th}$ frame to generate a plurality of output images to a display panel for being displayed thereon.

Briefly summarized, the present invention circuit and image processing method can identify positions of an object in partial frames only, and further calculate/predict positions of the object in other frames according to the position of the object in these partial frames, which can reduce loading of the circuit during image identification.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object position determination circuit, comprising:
   a receiving circuit, configured to receive an $N^{th}$ frame and an $(N+M)^{th}$ frame of an image signal, wherein N is a positive integer, and M is a positive integer greater than one;
   a detecting circuit, coupled to the receiving circuit, configured to detect positions of an object in the $N^{th}$ frame and the $(N+M)^{th}$ frame; and
   a calculating circuit, coupled to the detecting circuit, configured to estimate a position of the object in an $(N+M+A)_{th}$ frame according to the positions of the object in the $N^{th}$ frame and the $(N+M)^{th}$ frame, wherein A is a positive integer;
   wherein the detecting circuit generates a reliability parameter when detecting the position of the object in any of the $N^{th}$ frame and the $(N+M)^{th}$ frame; and the calculating circuit further generates a reliability parameter of the $(N+M+A)^{th}$ frame according to the reliability parameter of the $(N+M)^{th}$ frame, wherein the reliability parameters are configured to respectively indicate confidence levels of the positions of the object determined by the detecting circuit or the calculating circuit.

2. The object position determination circuit of claim 1, wherein the calculating circuit calculates the position of the object in the $(N+M+A)^{th}$ frame without detecting the position of the object in the $(N+M+A)^{th}$ frame.

3. The object position determination circuit of claim 1, wherein the calculating circuit utilizes a manner of extrapolation to calculate the position of the object in the $(N+M+A)^{th}$ frame according to the positions of the object in the $N^{th}$ frame and the $(N+M)^{th}$ frame.

4. The object position determination circuit of claim 1, further comprising:
   an output circuit, configured to respectively output regions within the $N^{th}$ frame, the $(N+M)^{th}$ frame and the $(N+M+A)^{th}$ frame to serve as the positions of the object, wherein a size of the region within the $(N+M+A)^{th}$ frame is greater than a size of the region within the $(N+M)^{th}$ frame.

5. The object position determination circuit of claim 1, wherein the reliability parameter of the $(N+M+A)^{th}$ frame is lower than the reliability parameter of the $(N+M)^{th}$ frame.

6. A circuit, comprising:
   an object position determination circuit, comprising:
      a receiving circuit, configured to receive an $N^{th}$ frame and an $(N+M)^{th}$ frame of an image signal, wherein N is a positive integer, and M is a positive integer greater than one;
      a detecting circuit, coupled to the receiving circuit, configured to detect positions of an object in the $N^{th}$ frame and the $(N+M)^{th}$ frame;
      a calculating circuit, coupled to the detecting circuit, configured to estimate a position of the object in an $(N+M+A)^{th}$ frame according to the positions of the object in the $N^{th}$ frame and the $(N+M)^{th}$ frame, wherein A is a positive integer; and an output circuit, configured to respectively output regions within the $N^{th}$ frame, the $(N+M)^{th}$ frame and the $(N+M+A)^{th}$ frame to serve as the positions of the object; and an image processing circuit, coupled to the object position determination circuit, configured to receive the image signal and perform image processing on the image signal according to the regions within the $N^{th}$ frame, the $(N+M)^{th}$ frame and the $(N+M+A)^{th}$ frame to generate a plurality of output images to a display panel for being displayed thereon;

wherein the detecting circuit generates a reliability parameter when detecting the position of the object in any of the $N^{th}$ frame and the $(N+M)^{th}$ frame; and the calculating circuit further generates a reliability parameter of the $(N+M+A)^{th}$ frame according to the reliability parameter of the $(N+M)^{th}$ frame, wherein the reliability parameters are configured to respectively indicate confidence levels of the positions of the object determined by the detecting circuit or the calculating circuit.

7. The circuit of claim 6, wherein the calculating circuit calculates the position of the object in the $(N+M+A)^{th}$ frame without referring to the $(N+M+A)^{th}$ frame of the image signal.

8. The circuit of claim 6, wherein the calculating circuit utilizes a manner of extrapolation to calculate the position of the object in the $(N+M+A)^{th}$ frame according to the positions of the object in the $N^{th}$ frame and the $(N+M)^{th}$ frame.

9. The circuit of claim 6, wherein a size of the region within the $(N+M+A)^{th}$ frame is greater than a size of the region within the $(N+M)^{th}$ frame.

10. The circuit of claim 6, wherein the image processing circuit adds a pattern on the $N^{th}$ frame, the $(N+M)^{th}$ frame and the $(N+M+A)^{th}$ frame to label the object according to the regions within the $N^{th}$ frame, the $(N+M)^{th}$ frame and the $(N+M+A)^{th}$ frame, to generate the plurality of output images to the display panel for being displayed thereon.

11. The circuit of claim 6, wherein the image processing circuit performs image processing on the regions within the $N^{th}$ frame, the $(N+M)^{th}$ frame and the $(N+M+A)^{th}$ frame in a manner different from other regions, to generate the plurality of output images to the display panel for being displayed thereon.

12. The circuit of claim 6, wherein the reliability parameter of the $(N+M+A)^{th}$ frame is lower than the reliability parameter of the $(N+M)^{th}$ frame.

13. A circuit, comprising:
an object position determination circuit, comprising:
a receiving circuit, configured to receive an $N^{th}$ frame and an $(N+M)^{th}$ frame of an image signal, wherein N is a positive integer, and M is a positive integer greater than one;

a detecting circuit, coupled to the receiving circuit, configured to detect positions of an object in the $N^{th}$ frame and the $(N+M)^{th}$ frame;

a calculating circuit, coupled to the detecting circuit, configured to estimate a position of the object in an $(N+M+A)^{th}$ frame according to the positions of the object in the $N^{th}$ frame and the $(N+M)^{th}$ frame, wherein A is a positive integer; and an output circuit, configured to respectively output regions within the $N^{th}$ frame, the $(N+M)^{th}$ frame and the $(N+M+A)^{th}$ frame to serve as the positions of the object and an image processing circuit, coupled to the object position determination circuit, configured to receive the image signal and perform image processing on the image signal according to the regions within the $N^{th}$ frame, the $(N+M)^{th}$ frame and the $(N+M+A)^{th}$ frame to generate a plurality of output images to a display panel for being displayed thereon;

wherein the detecting circuit generates a reliability parameter when detecting the position of the object in any of the $N^{th}$ frame and the $(N+M)^{th}$ frame; and the image processing circuit determines the reliability parameter of the $(N+M)^{th}$ frame according to the position of the object, and generates a reliability parameter of the $(N+M+A)^{th}$ frame according to the reliability parameter of the $(N+M)^{th}$ frame and the similarity of color/brightness information of the region between $(N+M)^{th}$ frame and $(N+M+A)^{th}$ frame.

14. The circuit of claim 13, wherein when the reliability parameter of the $(N+M+A)^{th}$ frame is greater than a threshold value, the image processing circuit adds a pattern on the $(N+M+A)^{th}$ frame to label the object according to the region within the $(N+M+A)^{th}$ frame, to generate the output image to the display panel for being displayed thereon; and when the reliability parameter of the $(N+M+A)^{th}$ frame is not greater than the threshold value, the processing circuit does not add the pattern on the $(N+M+A)^{th}$ frame to label the object.

15. The circuit of claim 13, wherein when the reliability parameter of the $(N+M+A)^{th}$ frame is greater than a threshold value, the image processing circuit performs image processing on the region within the $(N+M+A)^{th}$ frame in a manner different from other regions, to generate the output image to the display panel for being displayed thereon; and when the reliability parameter of the $(N+M+A)^{th}$ frame is not greater than the threshold value, the processing circuit does not performs image processing on the region within the $(N+M+A)^{th}$ frame in the manner different from the other regions.

* * * * *